United States Patent
Musselman

(10) Patent No.: US 7,311,317 B2
(45) Date of Patent: Dec. 25, 2007

(54) SNOWMOBILE RUNNER AND METHOD OF MANUFACTURE

(75) Inventor: Robert Musselman, Hope, MI (US)

(73) Assignee: International Engineering and Manufacturin, Inc., Hope, MI (US)

( * ) Notice: Subject to any disclaimer, the term of this patent is extended or adjusted under 35 U.S.C. 154(b) by 197 days.

(21) Appl. No.: 10/857,528

(22) Filed: Jun. 1, 2004

(65) Prior Publication Data

US 2007/0096433 A1    May 3, 2007

(51) Int. Cl.
*B62B 17/02* (2006.01)
*B62B 17/04* (2006.01)

(52) U.S. Cl. ............... 280/28; 280/11.18; 280/22.1; 180/182; 180/190

(58) Field of Classification Search ............ 280/608–9, 280/26, 900, 7.12, 28, 22.1, 22, 11.18, 16, 280/17; 180/182, 190
See application file for complete search history.

(56) References Cited

U.S. PATENT DOCUMENTS

| | | | | |
|---|---|---|---|---|
| 375,214 | A * | 12/1887 | Stevens | 280/28 |
| 2,213,966 | A * | 9/1940 | Nygaard | 280/11.18 |
| 3,085,141 | A | 4/1963 | Rossner | |
| 3,517,150 | A | 6/1970 | McIntosh et al. | |
| 3,732,939 | A * | 5/1973 | Samson | 280/28 |
| 3,857,578 | A * | 12/1974 | Alton | 280/28 |
| 4,077,639 | A * | 3/1978 | Reedy | 280/28 |
| 4,577,876 | A * | 3/1986 | Harris | 280/13 |
| 4,591,174 | A * | 5/1986 | White | 280/28 |
| 4,687,893 | A | 8/1987 | Rasmussen et al. | |
| 4,983,804 | A | 1/1991 | Chan et al. | |
| 5,093,545 | A | 3/1992 | McGaffigan | |
| 5,344,168 | A * | 9/1994 | Olson et al. | 280/28 |
| 5,599,030 | A * | 2/1997 | Campbell et al. | 280/28 |
| 6,047,876 | A | 4/2000 | Smith | |
| 6,354,391 | B1 | 3/2002 | Cormican | |
| 6,474,662 | B1 | 11/2002 | Cormican | |
| 6,513,612 | B2 * | 2/2003 | Moriyama et al. | 180/182 |
| 6,619,676 | B2 | 9/2003 | Cormican | |
| 6,631,912 | B2 * | 10/2003 | Metheny | 280/28 |
| 6,971,653 | B2 * | 12/2005 | Takahiko | 280/28 |
| 6,974,139 | B2 * | 12/2005 | Lund | 280/28 |
| 7,159,876 | B2 * | 1/2007 | Metheny | 280/28 |
| 2001/0013687 | A1 | 8/2001 | Cormican | |
| 2002/0079659 | A1 | 6/2002 | Cormican | |
| 2004/0227312 | A1 * | 11/2004 | Dick et al. | 280/28 |

FOREIGN PATENT DOCUMENTS

WO    WO 99/12689    3/1999

* cited by examiner

*Primary Examiner*—J. Allen Shriver
*Assistant Examiner*—Vaughn T. Coolman
(74) *Attorney, Agent, or Firm*—Robert L. McKellar; McKellar IP Law, PLLC

(57) ABSTRACT

A traction runner for a snow ski is fabricated of a lightweight metal such as aluminum and is formed on its upper surface with a channel in which mounting members are fixed. A channel is formed also in the lower surface and a carbide wear strip is brazed through induction heating to the aluminum runner body.

23 Claims, 2 Drawing Sheets

SNOWMOBILE RUNNER AND METHOD OF MANUFACTURE

BACKGROUND OF THE INVENTION

1. Technical Field

This invention relates generally to wear bars or traction runners or bars used on the lower running surface of a ski for a snowmobile or the like to reduce wear on the skis and to improve steering traction, particularly on icy surfaces.

2. Related Art

It is common in the field of performance snowmobiling to outfit the skis of the snowmobile with wear bars or runners in order to improve the steering traction and thus handling of the snowmobile. The use of such traction runners is particularly common for races carried out on an ice track.

The typical traction bar used in performance racing of snowmobiles is constructed from a length of steel rod that serves as the body of the traction bar. A pair of threaded studs are welded to the top side of the bar and are received in associated mounting holes provided in the skis to enable the wear bar to be mounted removably on the skis by corresponding fastener nuts threaded onto the mounting studs on the top side of the skis. An opposite lower side of the wear bar is typically formed to include a channel in which a wear strip of carbide material is metallurgically bonded and finished to a knife edge to present a sharp, wear-resistant traction strip extending lengthwise of the ski and acting to bite into the terrain to provide enhanced traction and steerability, particularly on icy terrain.

One drawback to the use of wear bars is the weight which they add to the snow machine. However, the benefits resulting from the increased traction and handling far outweigh the negative effects of added weight, and thus the use of traction bars of the general type described above have become accepted as an essential accessory for use in performance snowmobile racing. Prior to this invention, efforts to use lighter weight materials for the traction bar, such as aluminum, have failed due to the inability to find a suitable way to form a metallurgical bond of the aluminum traction bar and ceramic wear strip insert that would hold up under the abusive conditions that such traction strips are subjected to, including repeated pounding and torquing from sudden impacts with the terrain and frequent changes in the steering direction. These forces introduce stress at the interface of the ceramic wear strip and the parent traction bar materials, causing a poorly bonded carbide wear strip of the prior aluminum traction bars to fail and separate from the aluminum body. It is an object of the present invention to overcome or greatly minimize the disadvantages and limitations of the prior traction bars.

SUMMARY OF THE INVENTION AND ADVANTAGES

A traction bar or runner constructed according to a presently preferred embodiment of the invention includes an elongate runner body fabricated of a non-ferrous based lightweight metal extending longitudinally between opposite ends and having an upper surface and a lower surface. At least two mounting members are fabricated separately from the runner body and are fixed to the upper surface. A wear strip fabricated of a material that is relatively harder than that of the aluminum runner body is secured to the lower surface of the runner body, presenting an exposed ice-engaging running surface of the wear strip. The runner body is formed in its upper surface with an elongate channel in which the mounting members are received and fixed in longitudinally spaced relation to one another such that the channel extends beyond the mounting members in the space between the mounting members.

A traction bar constructed according to the present invention has the advantage of providing all of the performance attributes of a conventional steel-body runner, but with significantly less weight.

Further weight reductions are recognized through provision of the channel in the upper surface of the runner body, which serves to provide a recessed mounting pocket for the mounting members to enhance their rigidity, as well as eliminating material in the region between the mounting members to contribute further to weight reduction.

The invention also provides a method of manufacturing a runner for a snowmobile ski, or the like. The method includes preparing a runner body from an aluminum-based metal extending longitudinally between opposite ends and having an upper and lower surface. The upper surface is provided with mounting structure to enable the runner to be mounted on a ski of a snow or ice-going vehicle. The bottom surface is formed with a longitudinally extending channel. A carbide wear strip is prepared to have a size and shape to be received with a slip fit into the channel of the aluminum-based runner body. A fluxing agent and brazing material is also introduced to the channel. A brazed joint is formed between the wear strip and aluminum runner body by disposing the assembled runner body and wear strip in an induction heating field. The induction heating field is energized causing the fluxing agent to react with the aluminum body to break up any oxides on the surface walls of the channel and to melt the brazing metal. Through capillary action, the melted brazing material fills the interstitial regions between the carbide wear strip and walls of the channel so as to provide a complete, uniform application of the brazing material across all surfaces of the channel and facing surfaces of the wear strip. The assembly is then removed from the induction heating field and allowed to cool, forming a uniform brazed joint permanently securing the carbide strip within the channel.

The invention has the advantage of providing a runner that is lightweight in construction through use of a light metal alloy as well as through the provision of the extended channel in the upper wall between the mounting features which functions not only to easily and quickly laterally locate and receive the mounting features for attachment to the runner body, but as the further beneficial effect of removing some of the runner body material between the mounting features in order to reduce the overall weight of the runner assembly.

The invention has the further advantage of providing a method by which a carbide wear strip can be successfully joined via brazing to an aluminum runner body through use of an appropriate fluxing agent and induction heating source which breaks up the otherwise troublesome oxides in the lower channel of the aluminum body that would impair a good bond between the wear strip and aluminum body. The induction heating further has the advantage of providing controlled, uniform heating at the interface to coordinate the timing of the melting of the fluxing agent and brazing material such that a satisfactory bond is achieved between the carbide wear strip and aluminum runner body.

THE DRAWING

These and other features and advantages of the present invention will become better understood when considered in connection with the following drawing and detailed description, in which.

DETAILED DESCRIPTION

Figure 1:
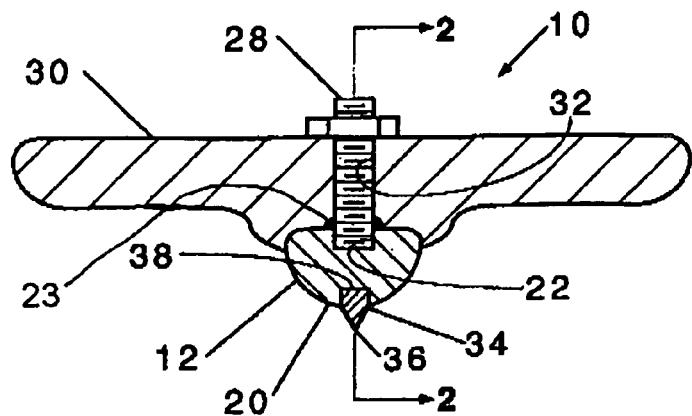
FIG. 1 is a cross-sectional end view of a ski assembly having a traction bar mounted thereon, taken along the section line 1-1 of FIG. 2.

A traction bar or runner constructed according to a presently preferred embodiment of the invention is shown generally at 10 in the drawing and includes a runner body 12 extending longitudinally between opposite ends 14, 16 and having an upper surface 18 and a lower surface 20. The runner body is fabricated of a light metal alloy, such as magnesium or aluminum-based alloys. While the cross-sectional shape may vary, the illustrated embodiment initially has a generally circular cross-section and thereafter has the top portion thereof cut or otherwise removed in a truncated fashion. The opposite ends 14, 16 are slightly upturned in order to extend through associated mounting holes formed in the ski on which the runner is mounted.

The runner body 12 may be formed, for example, from a length of rod material and formed or bent to shape as necessary to fit the contour of the particular ski on which it is to be mounted. The non-ferrous lightweight metal material is preferably an aluminum alloy, although other light metals, such as magnesium alloys, or the like, could be used and are contemplated by the present invention. The preferred aluminum alloy is T6061, although the invention is not to be limited to this particular alloy of aluminum.

An elongated longitudinally extending top channel 22 is formed in the upper surface 18 (FIGS. 1-8). This channel results in removal of a portion of the runner body material, thus reducing the weight of the runner body 12 by the amount of material removed by the formation of the channel 22. The depth of the channel 22 is proportionately small relative to the thickness or diameter of the runner body 12, and is shown exaggerated in FIG. 2 for purposes of illustration. In practice, the channel 22 will extend less than half the thickness or diameter of the runner body, and preferably less than one quarter of the thickness. The particular depth will depend to some degree on the particular alloy selected for the runner body 12 as well as other structural considerations such as the particular cross-sectional geometry and length of the runner body 12 chosen. In any regard, the formation of the channel 22 should be such that it does not substantially reduce the overall strength of the runner body 12 below the point where it would be inadequate for usage for its intended purpose.

Figure 2:
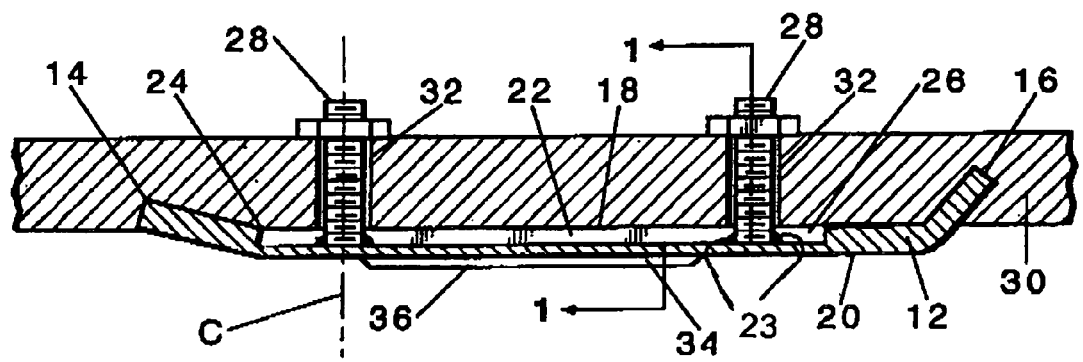
FIG. 2 is a cross-sectional view taken substantially along the section line 2-2 of FIG. 1.
Figure 3:
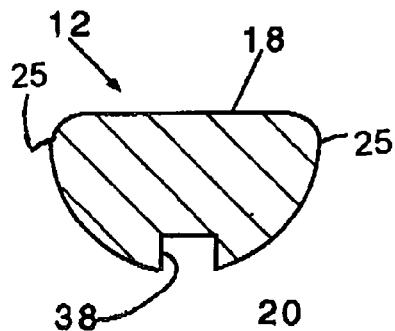
FIGS. 3-7 illustrate various manufacturing stages of the traction bar.
Figure 4:
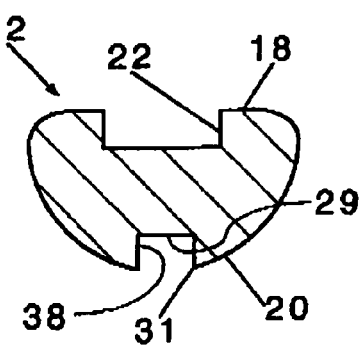

The channel 22 has opposite ends 24, 26 and the length of the channel 22 is preferably more than ten times the width of the channel. At least a pair of mounting members 28 are disposed in the channel 22 and project upwardly therefrom beyond the upper surface 18 of the runner body 12. The mounting members 28 are configured to be attachable in suitable manner to a snowmobile ski 30 on which the runner body is to be mounted (FIGS. 1-2). For example, the mounting members 28 illustrated in the exemplary embodiment are in the form of threaded studs or rods whose lower ends are press fit or threaded into a tapped hole in the channel 22. Thereafter the mounting members are welded or brazed at 23 or otherwise suitable secured by or other fastening means to the mounting member 28 resulting in the mounting member 28 being fixed and unitized with the runner body 12. By press-fit, it is meant that the mounting members 28 require some amount of force to be introduced into the channel 22 and once installed, some amount of friction between the mating materials is present providing enough retention to prevent the runner bar 12 and mounting members 28 from separating under the force of gravity.

The mounting members 28 are longitudinally spaced from one another and located preferably adjacent the opposite ends 24, 26 of the channel 22, although they could be located other than at the extreme ends of the channel as illustrated. The mounting members 28, which may be fabricated from aluminum or steel, are longitudinally spaced from one another at a distance corresponding to associated mounting features provided in the ski 30 to which the runner body is to be attached. In the case of the threaded stud mounting members 28, the ski 30 is formed with a pair of longitudinally spaced openings 32 through which the upper ends of the threaded studs 28 can be extended, bringing the upper surface 18 of the runner body 12 flush against the underside of the ski 30 and with the studs projecting above the opposite upper surface of the ski for receiving an internally threaded nut (FIGS. 1 and 2). In this way, the runner body 12 can be removably fastened to the underside of the ski for replacement as needed.

The channel 22 extends from each mounting member 28 toward the other mounting member, and thus is longer than the combined longitudinal dimensions of the mounting members. In the illustrated embodiment, the channel 22 extends the full span between the mounting members (i.e., is continuous), although the invention contemplates that the mounting channel could be interrupted by one or more cross ribs (not shown). As such, the term "channel" should be interpreted to include either a continuous channel or a nearly continuous channel, but for one or more interruptions in its continuity between the mounting members.

Figure 8:
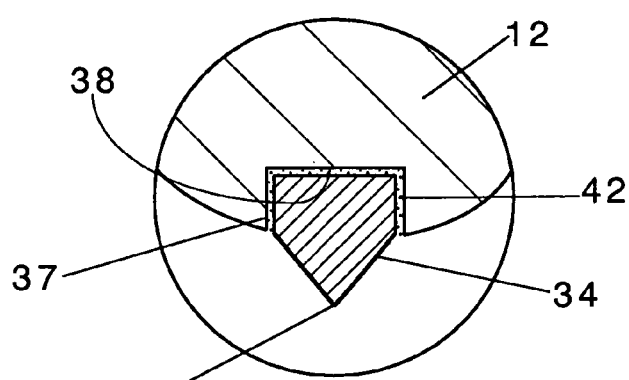
FIG. 8 is a greatly enlarged view of the portion illustrated in the chainline circle of FIG. 7.

A wear strip 34 of a relatively harder material is fixed to the opposite lower side 20 of the runner body 12 and projects therefrom to present a lower terrain-engaging running edge 36 which is more resistant to wear than that of the runner body material. The wear strip 34 is preferably in the form of an elongated carbide member which may have a generally rectangular cross-section having laterally opposite upper sides 37 with its lower extremity downwardly converging to define the terrain-engaging surface or edge 36 (FIG. 8). The lower surface 20 of the runner body 12 is preferably formed with a wear strip channel or groove 38 which extends in the longitudinal direction of the runner body and is dimensioned to snugly receive the wear strip 34. The channel or slot 38 includes a base 29 and laterally confronting side walls 31 and is substantially shorter and narrower than the upper slot 22. The slots or channel 22 and 38 are laterally centered between the laterally opposite sides 25 of the host aluminum bar or runner body 12. This construction has the advantage of quickly, easily, and accurately laterally positioning the threaded fastening rods 28 between the runner sides 25 prior to being threaded or press fit into the channel 22. Without the slots 22, the accurate lateral positioning of the threaded rods 28 is problematic. Although the slot 38 and the carbide wear strip 34 are illustrated as having generally rectangular complementally formed shapes, it should be understood that the slots 38 and wear strip 34 could be configured with complementally formed semi-circular or half diamond configuration. It should be noted that the terrain engaging edge 36 and the centerlines or axes C of the mounting members 28 lie in the same plane P.

Figure 6:
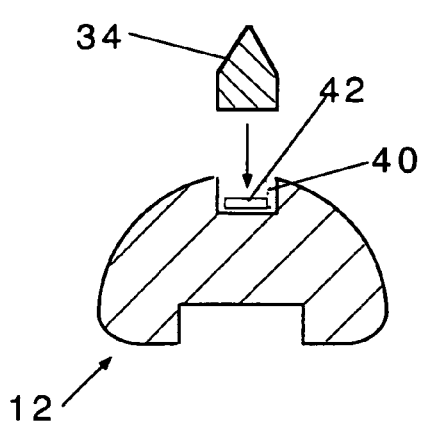
Figure 7:
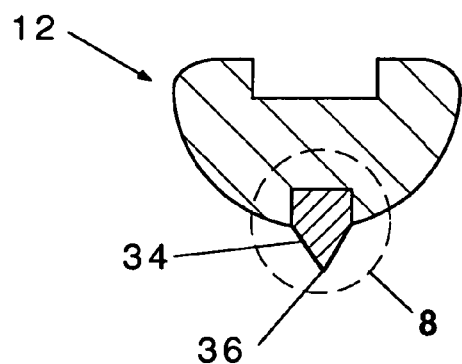

According to a preferred embodiment of the invention, the runner body 12 is preferably fabricated of an aluminum alloy. In order to achieve an adequate bond between the wear strip 34 and the aluminum runner body 12 a fluxing agent 40 is introduced to the channel 38 together with the selected brazing material 42 prior to installing the wear strip 34 in the channel 38. The fluxing agent 40 is preferably one that favorably reacts with any aluminum oxide present on the channel walls of the aluminum runner body when heated to break up any oxides that would otherwise impair the brazing material from fully and uniformly wetting and bonding the facing surfaces of the wear strip and wear strip channel. One suitable fluxing agent is sold under the Trademark SUPER ALLOY ONE FLUX by Muggy Weld. The brazing material can comprise a length of conventional brazing wire of initially round section which can be flattened into a thinner, rectangular shape of the upper portion of the wear strip and laid in the bottom of the wear strip channel together with the fluxing agent (FIG. 6). The thin, rectangular shape enables the wear strip to be installed fully in the wear strip channel to its final home position prior to bonding. Once assembled, the runner body 12, flux agent 40 and brazing material 42 are trapped in the channel 38 by the wear strip 34.

Figure 5:
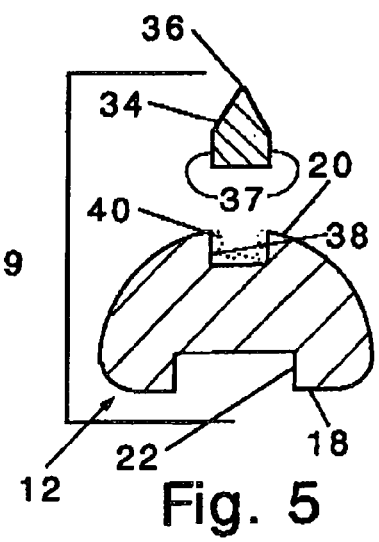

Preferably, the fluxing agent 40 and brazing strip material 42 are deposited in the slot 38 while the runner body 12 is temporarily inverted to the position illustrated in FIG. 5. Thereafter, the carbide wear strip 34 is placed into the upwardly opening slot 38 above the brazing strip 42 which is located at the bottom 29 of the inverted slot 38.

Figure 10:
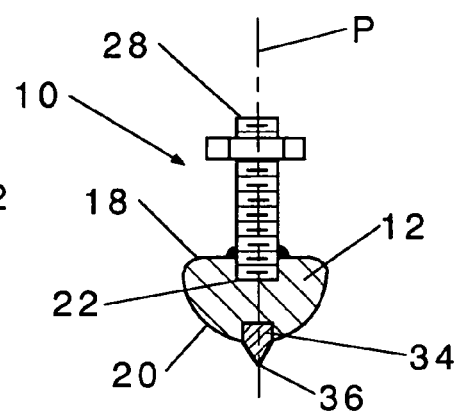
FIG. 10 is a slightly enlarged cross-sectional end view of only the completed traction bar.
Figure 9:
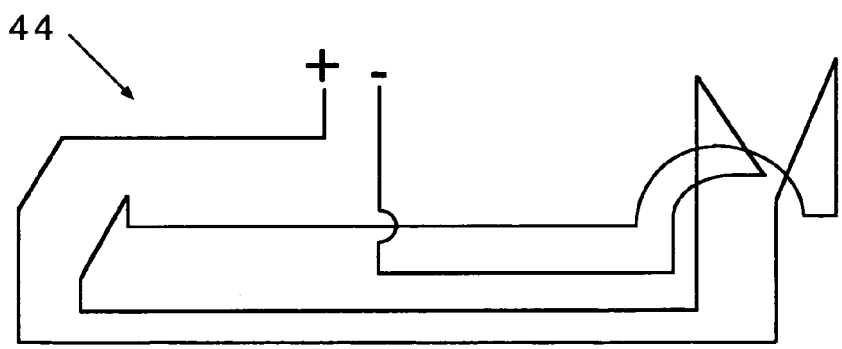
FIG. 9 is a schematic representation of the induction heating source.

The assembly, with the assembly inverted in the inverted position illustrated in FIGS. 5 and 6, is introduced to an induction heating field 44, which preferably comprises an open channel induction heating fixture in which the assembly is received. Once the induction heating field is energized, the flux agent 40 and brazing material 42, along with the runner body 12 and wear strip 34 are uniformly heated at their interface causing the fluxing agent 40 to react with the walls of the channel 38 to break up any oxides on the surface of the walls of the channel 38. The brazing material is simultaneously melted and, through capillary action, percolates upwardly between and wets the confronting walls 31 of the channel 38 and facing surface 37 of the wear strip 34. The braze material 42 bonds uniformly to the walls of the channel 38 and the wear strip 34. Once brazed, the assembly is removed to provide the resultant runner base 10 (FIG. 10).

The invention contemplates that the mounting members 28 can be attached before or after securement of the wear strip 34.

Obviously, many modifications and variations of the present invention are possible in light of the above teachings. It is, therefore, to be understood that within the scope of the appended claims, the invention may be practiced otherwise than as specifically described. The invention is defined by the claims.

What I claim is:

1. A traction improving wear bar mountable on a ski of an ice-going vehicle comprising:

an elongate runner body, fabricated of a nonferrous based lightweight metal, having longitudinally opposite ends, laterally opposite sides, an upper surface and a lower surface opposite said upper surface;

an elongate wear strip, fabricated of a different and relatively harder material than that of said runner body secured to said lower surface of said runner body presenting an exposed ice-engaging running surface of said wear strip; and at least two mounting members fabricated as separate pieces from said runner body and secured to said runner body in longitudinally spaced relation for mounting said runner body on a ski;

an elongate channel recessed in said upper surface of said runner body extending substantially between and receiving said mounting members.

2. The traction improving wear bar of claim 1, wherein said mounting members have lower terminal ends received by said elongate channel and fixed to said runner body.

3. The traction improving wear bar of claim 2 wherein said lightweight metal of said runner body comprises an aluminum-based material; relatively harder material of said wear strip comprises carbide.

4. The traction improving wear bar of claim 3 wherein said runner body includes a lower channel formed in said lower surface and in which said carbide wear strip is received.

5. The traction improving wear bar of claim 4 wherein said carbide wear strip is secured in said lower channel by a metallic joint at an interface of said wear strip and said lower channel.

6. The fraction improving wear bar of claim 5 wherein said metallic joint comprises a brazed joint.

7. The traction improving wear bar of claim 6 wherein said wear strip is dimensioned relative to said lower channel for a slip-fit within said channel.

8. The traction improving wear bar of claim 7 wherein the entire interface area between said wear strip and said lower channel is secured by brazing.

9. The fraction improving wear bar of claim 8 wherein a fluxing agent is used to disrupt any aluminum oxide layer that may be present on the aluminum-based runner body material of said lower channel.

10. The traction improving wear bar of claim 1 wherein said mounting member comprises threaded studs.

11. The traction improving wear bar of claim 10 wherein said threaded studs are fabricated of ferrous-based material.

12. The fraction improving wear bar of claim 10 wherein said threaded studs are press-fit in said channel and secured to said runner body by a metallic joint at an interface between said studs and said channel.

13. The traction improving wear bar of claim 12 wherein said metallic joint comprises brazing.

14. The traction improving wear bar set forth in claim 4 wherein said elongate channel is laterally centered between said sides; each of said mounting members including threaded rods having lower ends which are received by said elongate channel with a press-fit.

15. The traction improving wear bar set forth in claim 14 including a weldment further fixing said threaded rods to said runner body.

16. The traction improving wear bar set forth in claim 15 wherein said elongate channel extends longitudinally outwardly beyond each of said threaded rods.

17. The traction improving wear bar set forth in claim 16 wherein each of said threaded rods includes an axis and said ice-engaging running surface includes a lower terminal knife edge for penetrating any ice to be traversed; each of said axes and said knife edge lying in the same plane.

18. A traction improving wear bar for mounting on the underside of a snowmobile ski for bearing against the terrain comprising:
   an elongate aluminum runner of a predetermined hardness having longitudinally opposite ends,
   laterally opposite sides,
   upper and lower opposed surfaces; and
   first and second elongate channels provided in said upper and lower surfaces, respectively, and laterally centered between said laterally opposite sides;
   at least two longitudinally spaced apart mounting rods each having a lower terminal end received by said first channel and fixed to said runner; and
   an elongate wear strip, of a second predetermined greater hardness greater than said predetermined hardness, received by said second elongate channel secured to said lower surface of said runner, and including downwardly converging sides terminating in a sharp terrain penetrating edge.

19. The wear bar set forth in claim 18 wherein said elongate wear strip is fabricated from carbide.

20. The wear bar set forth in claim 19 wherein said first channel has a length and width substantially greater than the length and width.

respectively, of said second channel.

21. The wear bar set forth in claim 20 wherein said first channel includes longitudinally spaced opposite ends which terminate longitudinally outwardly of said mounting rods.

22. The wear bar set forth in claim 21 wherein said mounting rods are threadedly coupled to said aluminum runner.

23. The wear bar set forth in claim 22 wherein said carbide wear strip is secured to said aluminum runner by a metallic joint at an interface of said wear strip and said lower channel.

* * * * *